United States Patent [19]
Dworkin et al.

[11] Patent Number: 6,003,057
[45] Date of Patent: Dec. 14, 1999

[54] GALOIS FIELD ARITHMETIC LOGIC UNIT CIRCUIT

[75] Inventors: James Douglas Dworkin; Michael John Torla, both of Chandler; Rodney Clair Tesch, Phoenix, all of Ariz.; Scott Vanstone, Waterloo, Canada

[73] Assignee: Motorola, Inc., Schaumbnurg, Ill.

[21] Appl. No.: 08/998,376

[22] Filed: Dec. 24, 1997

[51] Int. Cl.[6] .................................................... G06F 7/00
[52] U.S. Cl. ............................................................ 708/492
[58] Field of Search ................................. 364/746, 746.1

[56] References Cited

U.S. PATENT DOCUMENTS

| | | | |
|---|---|---|---|
| 5,227,992 | 7/1993 | Lee et al. | 364/746.1 |
| 5,787,028 | 7/1998 | Mullin | 364/746.1 |

Primary Examiner—Tan V. Mai
Attorney, Agent, or Firm—James A. Lamb

[57] ABSTRACT

A Galois Field arithmetic logic unit (GF ALU) circuit (200) that generates a GF product of size M includes a first and a second input field element register (205, 210), a result field element register (215), a plurality, I, of subfield sets of logic gates (255, 260, 265), a plurality, S, of extension sets of logic gates (270, 275), and 3M switches (135). M is equal to S multiplied by I. A Galois Field of size M, S, and I each has an optimal normal basis. The first and second input field element registers (205, 210) are alternately coupled to the result field element register (215) by the I subfield sets of logic gates (255, 260, 265) in a first configuration and by the S extension sets of logic gates (270, 275) in a second configuration. The 3M switches (135) alternate the first and second configurations.

9 Claims, 7 Drawing Sheets

GALOIS FIELD ARITHMETIC LOGIC UNIT CIRCUIT

FIELD OF THE INVENTION

This invention relates in general to arithmetic logic units, and in particular to arithmetic logic units used for a Galois Field multiply function.

BACKGROUND OF THE INVENTION

Financial transactions are beginning to be offered in wired networks, such as the world wide web, and are desirable in wireless networks, such as paging networks and cellular networks. The need for secure communication of financial transactions is paramount in order for them to be successfully used in such environments. Methods of providing the needed security include the use of finite field arithmetic, such as Galois Field (GF) arithmetic, for encryption and decryption of secure messages. For optimal speed of calculations using Galois Field arithmetic, Galois Field arithmetic logic units (ALUs) that are designed especially for Galois Field arithmetic are employed. One implementation of a Galois Field ALU is a special-purpose ALU that implements addition (subtraction), squaring, multiplication, and inverse in a finite field. A specific Galois Field typically used is a field with $2^M$ elements, denoted by $GF(2^M)$. Herein, M is called the field size. Any element in the field (there are $2^M$ total) can be represented as an M-bit binary string. This field is closed under all of the above operations. Closed essentially means that the result of performing any of these arithmetic operations always is another element in the field.

An example of a prior art Galois Field ALU is described herein as one which provides the functions of Galois Field addition (GF addition), GF squaring, and GF multiplication. Other functions, such as the important function of finding a GF inverse (GF inversion) can be performed using combinations of one or more of the three functions of GF addition, GF squaring, and GF multiplication. Examples of an ALU providing these three functions are described herein using a $GF(2^6)$, which has 64 elements. Each of the 64 elements in the $GF(2^6)$ is preferably represented by a unique 6 bit pattern. (There are exactly 64 unique patterns possible.)

FIG. 1 is an electrical block diagram of a prior art GF ALU 100 of size M=6 that shows the GF ALU 100 configured for the GF addition function. The GF ALU 100 comprises an A field element register 105 and a B field element register 110 which are input registers, a C field element register 115, which is a result field element register, and logic gates 130. The A, B, and C field element registers 105, 110, 115 each comprise, respectively, six single bit registers 120, that are identified as single bit registers A0' to A5', B0' to B5', and C0' to C5', each comprising a conventional D input 121, a conventional Q output 122, and a conventional clock input 123. The A, B, and C field element registers 105, 110, 115 further comprise six switches 135, having one switch coupled to each D input 121. The GF ALU 100 comprises logic gates other than logic gates 130, and the switches 135 have inputs other than those shown in FIG. 1, as will be described with reference to FIGS. 2 and 3. A control signal (not shown in FIGS. 1–6) that is coupled to each of the switches selects one of the inputs to each switch in a conventional manner, depending on the configuration needed to perform the desired function, and couples the selected input to the D input of the associated single bit register 120. FIG. 1 shows a configuration of the GF ALU 100 after the single bit registers 120 of the A and B field element register 105, 110 have been loaded with bits A0–A5 and B0–B5 of first and second GF elements. (The bits are coupled to the switches 135 by paths not shown in FIG. 1.) Thus, the values at the Q outputs 122 of the A and B field element registers 105, 110 have the values A0–A5 and B0–B5 that have been loaded.

The outputs 122 of the single bit registers 120 of the GF ALU 100 are logically combined in different manners to perform the three functions cited above. The logical combination is provided by the logic gates 130, the inputs to the logic gates 130 from the single bit registers 120, which are identified by the values A0–A5 and B0–B5 shown at outputs of the single bit registers 122 and at the inputs 129 to the logic gates 130, and a coupling of outputs 131 of the logic gates 130 to the single bit registers 120 of the C field element register 115. In the case of this GF addition function, the logic gates 130 are all conventional Boolean Exclusive OR gates. An output 131 of each of the Boolean Exclusive OR gates 130 is coupled to a D input of one of the single bit registers 120 of the C field element register 115 through one of the switches 135. The coupling of the logic gates 130 is such that when a clock cycle is coupled to the clock inputs 123 of the C field element register 115, the outputs C0–C5 of the C field element register 115 are given by the following equations:

$$C0''=A0+B0$$

$$C1''=A1+B1$$

$$C2''=A2+B2$$

$$C3''=A3+B3$$

$$C4''=A4+B4$$

$$C5''=A5+B5$$

After being clocked, the outputs C0"–C5" of the C field element register 115 are those of a GF element that is the GF addition of the A field element and the B field element. In all equations shown herein, the addition operation (+) is implemented by the Boolean Exculsive OR function.

FIG. 2 is an electrical block diagram of a prior art GF ALU 100 that shows the GF ALU 100 configured for the GF squaring function. The GF ALU 100 comprises the A, B, and C field element registers 105, 110, 115, the switches 135, and the logic gates 130 (not shown in FIG. 2). As in the case of the GF addition function described with reference to FIG. 1, the single bit registers 120 of the A field element register 105 have been loaded with bits A0–A5 of a first GF element and the single bit registers 120 of the B field element register 110 have been loaded with bits B0–B5 of a second GF element. The switches 135 control the intercoupling of the single bit registers 120 of the A field element register 105 such that the outputs of each of the single bit registers 120 are coupled to a single bit register 120 of a next higher order (as indicated by a next higher number in the identifiers; e.g., A2' is coupled to A3') of the single bit registers 120. A first clock cycle is applied to the single bit registers 120 of the A field element register 105, which shifts the values that had been loaded to the single bit registers 120 of a next higher order, except for the value in single bit register A5' 120, which is shifted into single bit register A0' 120. The registers are identified with the prime indication to signify that their contents is not necessarily equal to the originally loaded input values (which are designated without the prime indication). The outputs of the single bit registers 120 are also indicated with the prime designation for the same reason. In this squaring configuration of the GF ALU 100, the switches 135 on the D inputs to the single bit registers 120 of the C field element register 115 are controlled such that the outputs A0'–A5' of the single bit registers 120 are coupled to the D inputs 120 on a one for one basis. When a second clock cycle is coupled to the clock inputs 124 of the C field element register 115, the outputs C0–C5 of the C field element register 115 are given by the following equations:

$$C0''=A0'=A5$$

$$C1''=A1'=A0$$

$$C2''=A2'=A1$$

$$C3''=A3'=A2$$

$$C4''=A4'=A3$$

$$C5''=A5'=A4$$

The Q outputs of the C field element register 115, comprising the Q outputs C0''–C5'', is the squared result of the original input to the A field element register 105. The GF ALU 100 can also be configured to square the GF element B, loaded in the C field element register 115, by control of the switches 135. In alternative embodiment, the output of the GF ALU 100 is generated directly from the A field element register 105 (or the B field element register 110), avoiding a need for the second clock cycle to obtain the result.

It will be appreciated that in general, for Galois Fields of size M, if the Galois Field can be represented in an optimal normal basis, there is a set of GF multiply equations comprising M equations in which each has 2M-1 terms, as is well known to one of ordinary skill in the art. When a multiply function is performed by the GF ALU 100, the values of C0–C5 that must be obtained are given by the GF multiply equations, which are shown below for a Galois Field of size 6:

$$C0=A0B1+A1(B4+B0)+A2(B3+B4)+A3(B2+B5)+A4(B2+B1)+A5(B5+B3)$$

$$C1=A1B2+A2(B5+B1)+A3(B4+B5)+A4(B3+B0)+A5(B3+B2)+A0(B0+B4)$$

$$C2=A2B3+A3(B0+B2)+A4(B5+B0)+A5(B4+B1)+A0(B4+B3)+A1(B1+B5)$$

$$C3=A3B4+A4(B1+B3)+A5(B0+B1)+A0(B5+B2)+A1(B5+B4)+A2(B2+B0)$$

$$C4=A4B5+A5(B2+B4)+A0(B1+B2)+A1(B0+B3)+A2(B0+B5)+A3(B3+B1)$$

$$C5=A5B0+A0(B3+B5)+A1(B2+B3)+A2(B1+B4)+A3(B1+B0)+A4(B4+B2)$$

In the equations shown herein, the product operation is implemented by the Boolean AND function. No symbol is used for the Boolean AND function in the equations—the normal convention of adjacency of two symbols indicates a Boolean AND function of adjacent symbols. It will be appreciated that the above equations could be implemented using a purely combinatorial logic configuration that could be accomplished by sixty 2 input Boolean Exculsive OR gates and thirty 2 input Boolean AND gates. However, this is logic gate intensive and would take up a lot of circuit area, so an alternative has been devised, which is illustrated in FIG. 3.

FIG. 3 is an electrical block diagram of a prior art GF ALU 100 that shows the GF ALU 100 configured for the GF multiply function. The GF ALU 100 comprises the A, B, and C field element registers 105, 110, 115, the switches 135, the logic gates 130 (not shown in FIG. 3), and logic gates 140. As in the case of the GF squaring function described with reference to FIG. 2, the single bit registers 120 of the A field element register 105 are initially loaded with bits A0–A5 of a first GF element and the single bit registers 120 of the B field element register 110 are initially loaded with bits B0–B5 of a second GF element. The switches 135 control the couplings of the Q outputs 122 of each of the single bit registers 120 of the A field element register 105 and the B field element register 110 are coupled to a D input 121 of a single bit register 120 of a next higher order of the respective field element register 105, 110. The logical combination of this multiplying configuration of the GF ALU 100 is provided by the intercoupling of the logic gates 140, by inputs 129 to the logic gates 140 from the single bit registers 120 (which are identified by the values A0'–A5' and B0'–B5' shown at the Q outputs 122 of the single bit registers 120 and at the inputs 129 to the logic gates 140), and a coupling of outputs 141 of the logic gates to the single bit registers 120 of the C field element register 115. In the case of this GF multiply function, the logic gates 140 are conventional Boolean Exclusive OR and AND gates. An output 141 of each of the Boolean Exclusive OR gates 140 is coupled to a D input of one of the single bit registers 120 of the C field element register 115 through one of the switches 135. The logic gates 140 are intercoupled such that when a clock cycle is coupled to the clock inputs 123 of the C field element register 115, the outputs C0''–C5'' of the C field element register 115, which are intermediate outputs until a last clock cycle is completed, are given by the following equations:

$$C0''=A0'B1'+C5'$$

$$C1''=A2'(B5'+B1')+C0'$$

$$C2''=A4'(B5'+B0')+C1'$$

$$C3''=A0'(B5'+B2')+C2'$$

$$C4''=A2'(B0'+B5')+C3'$$

$$C5''=A4'(B4'+B2')+C4'$$

In these equations, the single prime notations indicate prior values; that is, the values prior to the clock cycle that generates the double prime values. The single bit registers 120 C0'–C5' are initially loaded with Boolean 0's.

It will be appreciated that the terms of the logical combination for each intermediate value C0''–C5'' are the respective term of the GF multiply equations, plus a feed forward term that is the next less significant intermediate value, in a cyclical sense. Thus, for example, C3'' is given by the third term of the C3 equation in the GF multiply equations, A0'(B5'+B2'), plus C2'.

It will be further appreciated that when all the single bit registers 120 are clocked simultaneously for six consecutive clock cycles, a GF multiply function is completed and the outputs C0''–C5'' after the sixth clock cycle will have the values given by the GF multiply equations for $GF(2^6)$ shown above, shifted by one position (thus, the result for C0 is in C5', the result for C1 is in C0', etc.).

This approach has the advantage of substantially reducing the number of logic gates needed to eleven two input Boolean exclusive OR gates and six Boolean AND gates, but it has a disadvantage of requiring six clock cycles. This decrease in speed is particularly problematic in security related applications because of the number of times the multiply function must be used. It will be appreciated that the speed decrease of the technique used in FIG. 3 is directly proportional to the size, M, of the GF multiply function. In contrast, although the purely combinatorial logic approach is fast, requiring only one clock cycle to load the result into the C field element register, it requires a number of two input logic gates that exceeds $2M^2$.

Thus, what is needed is a circuit that performs the GF multiply function more speedily than the circuit described with reference to FIG. 3, but without the large number of gates described above with reference to the purely combinatorial logic approach.

BRIEF DESCRIPTION OF THE DRAWINGS

FIG. 3 is an electrical block diagram of the prior art Galois Field ($2^6$) Arithmetic Logic Unit that shows the GF ALU configured for the GF multiply function.

DETAILED DESCRIPTION OF THE DRAWINGS

Figure 1:
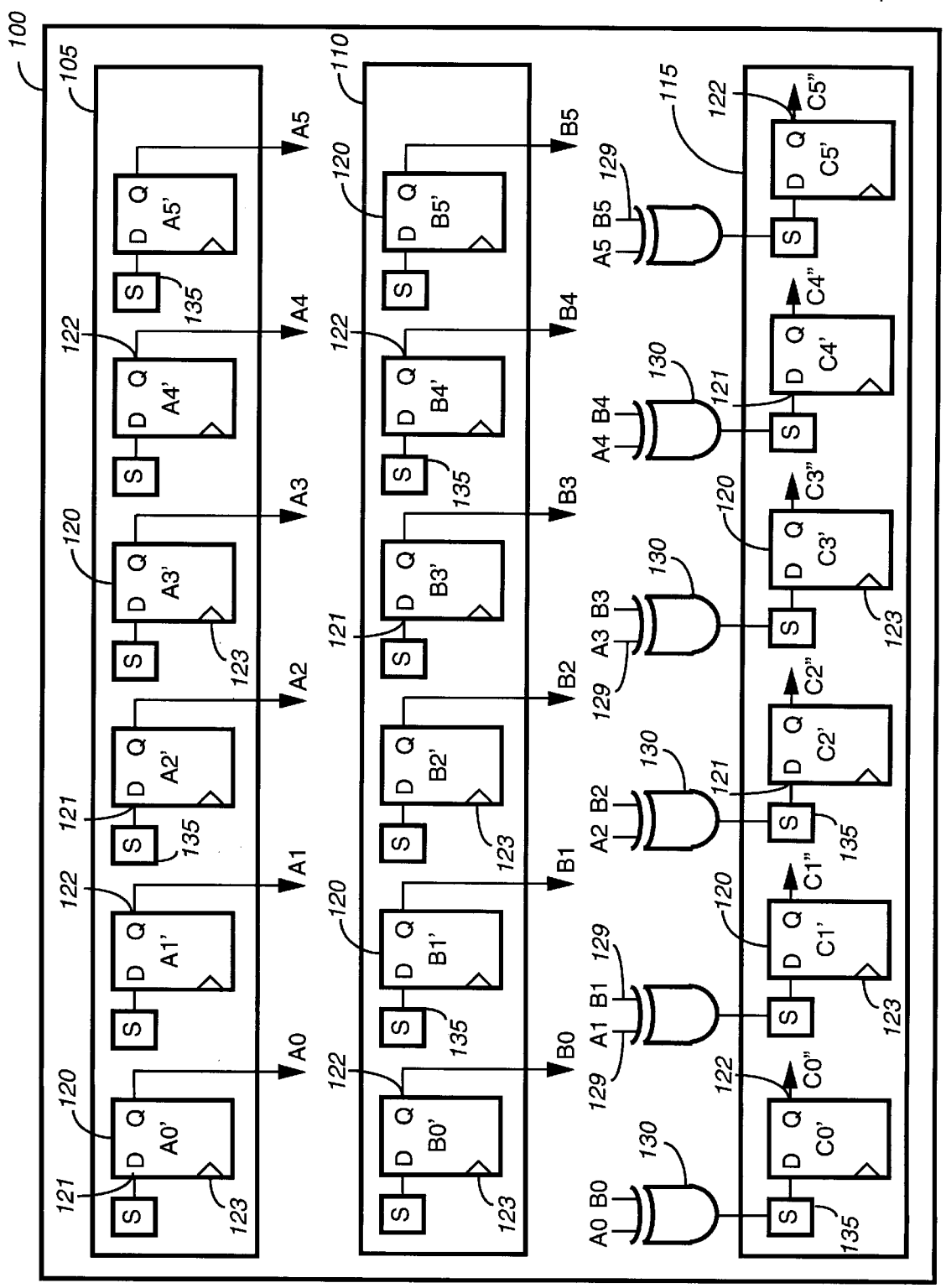
FIG. 1 is an electrical block diagram of a prior art Galois Field ($2^6$) Arithmetic Logic Unit (GF ALU) that shows the GF ALU configured for the GF addition function.
Figure 2:
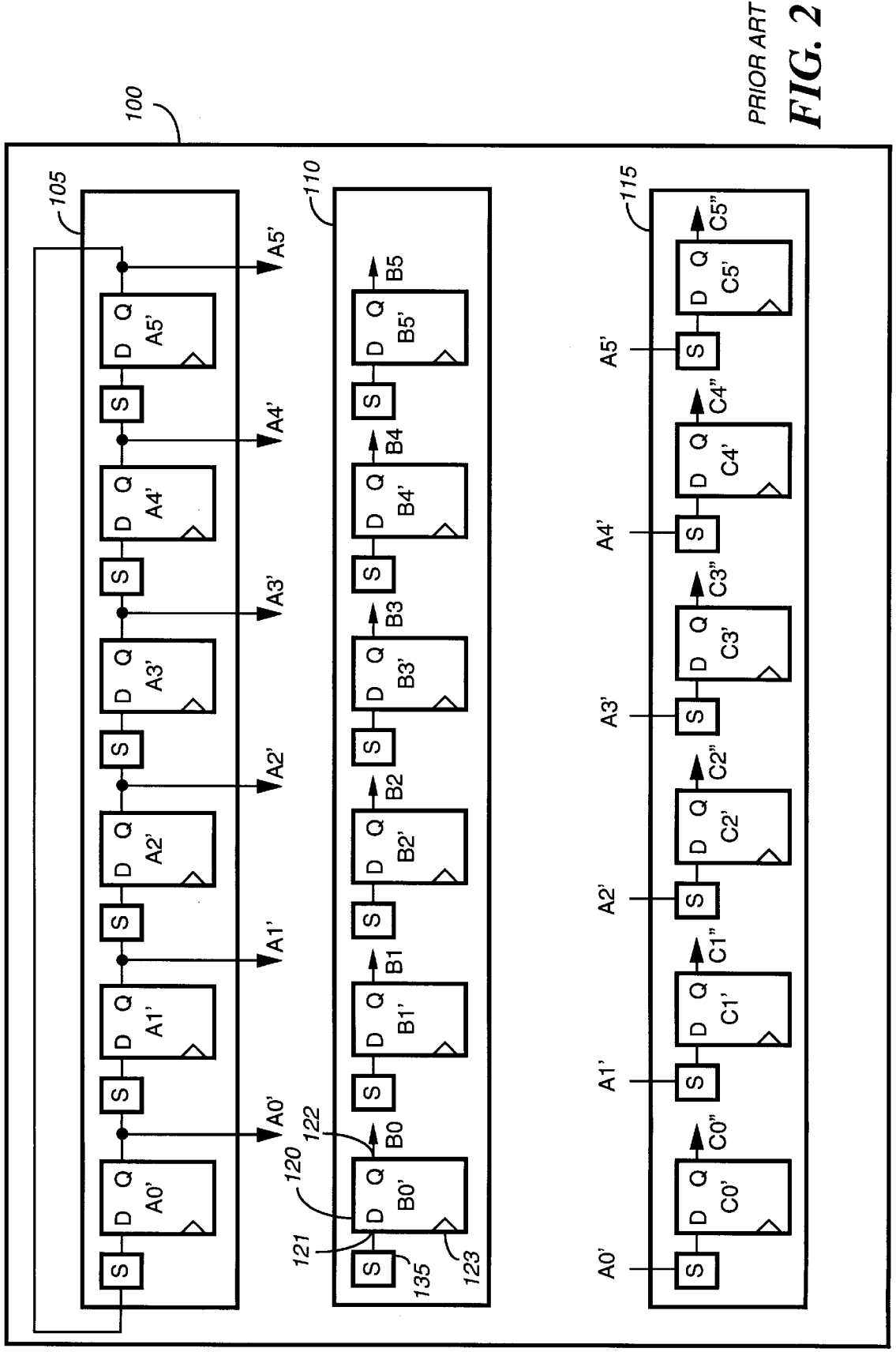
FIG. 2 is an electrical block diagram of the prior art Galois Field ($2^6$) Arithmetic Logic Unit that shows the GF ALU configured for the GF squaring function.
Figure 4:
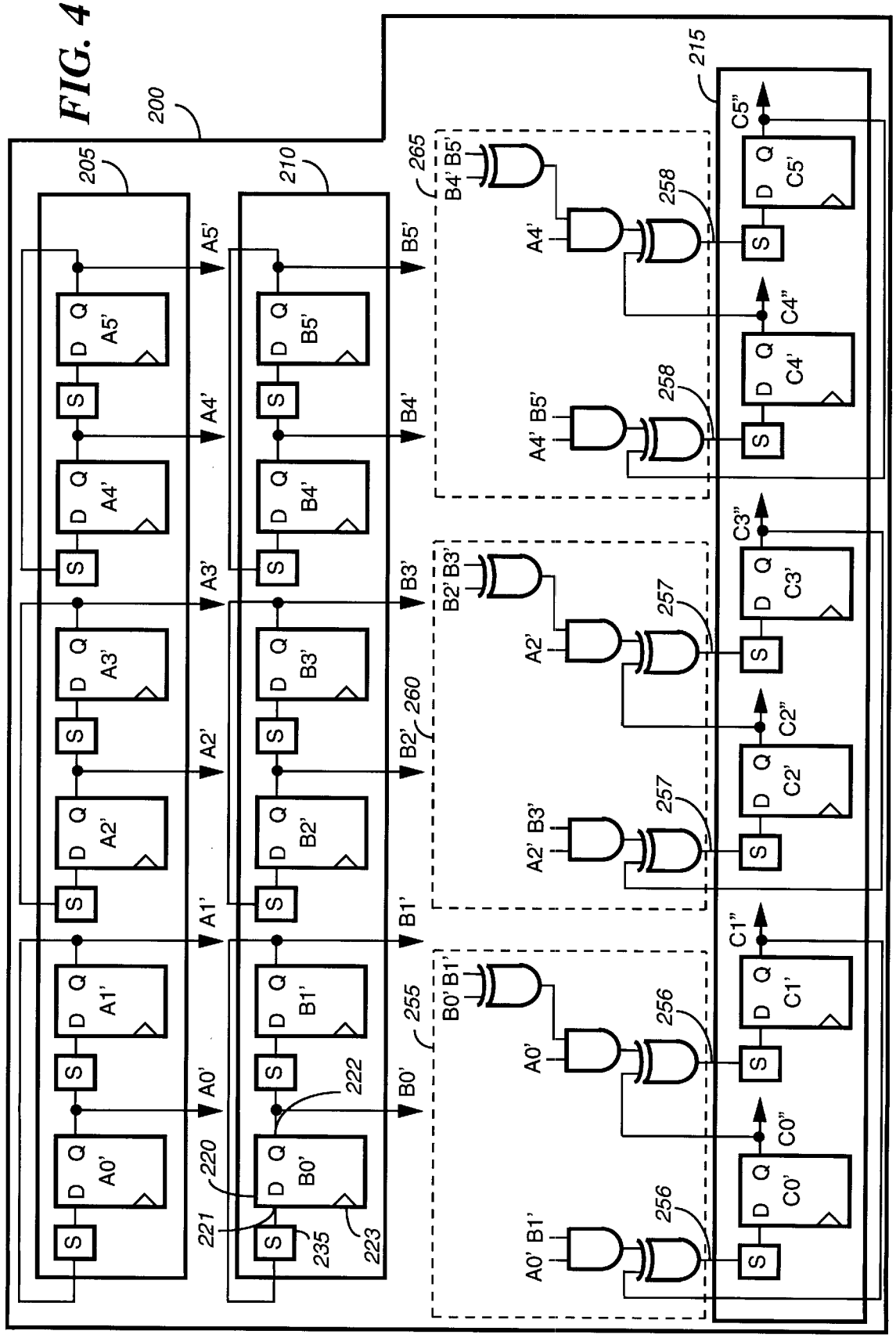
FIG. 4 is an electrical block diagram of a Galois Field ($2^6$) Arithmetic Logic Unit that shows the Galois Field ($2^6$) Arithmetic Logic Unit configured for a subfield portion of the GF multiplication function, in accordance with the preferred embodiment of the present invention.

Referring to FIG. 4, an electrical block diagram of a Galois Field ($2^M$) Arithmetic Logic Unit (GF ALU) 200 shows, for M=6, the GF ALU 200 configured for a subfield portion of the GF multiplication function, in accordance with the preferred embodiment of the present invention. This configuration is called the first configuration. The GF($2^M$) ALU 200 comprises an A field element register 205 that is a first input field element register, a B field element register 210 that is a second input field element register, a C field element register 215, that is a result field element register, and subfield sets of logic gates 255, 260, 265. The A, B, and C field element registers 205, 210, 215 each comprise, respectively, M single bit registers 220. In the example used hereinafter, M is 6, but it will be appreciated that M can be any other number for which the Galois Field GF($2^M$) has a normal basis. The M single bit registers 220 are identified as single bit registers A0' to A5', B0' to B5', and C0' to C5', each comprising conventional D inputs 221, Q outputs 222, and clock inputs 223. The A, B, and C field element registers 205, 210, 215 each comprise M (6) switches 235, having one switch coupled to each D input 221. The switches 235 have inputs other than those shown in FIG. 4, as will be described with reference to FIG. 5. A control signal (not shown in FIGS. 5 and 6) coupled to each of the switches selects one of the inputs to each switch in a conventional manner, depending on a configuration needed to perform the desired function, and couples the selected input to the D input of the associated single bit register 220.

The GF ALU 200 in this first configuration can also be described as comprising a plurality, I, of the subfield sets of logic gates 255, 260, 265. Each of the I subfield sets of logic gates 255, 260, 265 is identically configured in a subfield configuration, each having S switched outputs 256, 257, 258. M, I and S are chosen such that the arithmetic product of S and I is M, and a Galois Field of size M, S, and I each has a normal basis. In this example, I is 3 and S is 2. Each of the I (3) subfield sets of logic gates 255, 260, 265 is configured in the GF shift configuration to generate a subfield Boolean logic function determined by the unique set of GF multiply equations that exists for the Galois Field of size S (2) during the first configuration for the subfield portion of the GF multiply function.

The A field element register 205 has outputs A0', A1', A2', A3', A4', A5'. The B field element register 210 has outputs B1', B1', B2', B3', B4', B5'. The C field element register 215 has outputs C0", C1", C2", C3", C4", C5". When the GF ALU 200 is in the first configuration, the I (3) sets of subfield logic gates 255, 260, 265, the outputs of the A and B field element registers 205, 210, and the outputs of the C field element register 215 are coupled to generate outputs of the C field element register 215 each time the A, B, and field element registers 205, 210, 215 are clocked by a first clock.

Outputs generated by logic combinations of the set of logic gates 255, the "zeroth" and first single bit registers of the A, B, and C field element registers 205, 210, 215 and gate and register outputs selected by the input switches 235 of the A, B, and C field element registers 205, 210, 215 are as follows:

$C0''=A0'B1'+C1'$ $C1''=A0'(B0'+B1')+C0'$

Outputs generated by logic combinations of the set of logic gates 260, the second and third single bit registers of the A, B, and C field element registers 205, 210, 215 and gate and register outputs selected by the input switches 235 of the A, B, and C field element registers 205, 210, 215 are as follows:

$C2''=A2'B3'+C3'$ $C3''=A2'(B2'+B3')+C2'$

Outputs generated by logic combinations of the set of logic gates 265, the fourth and fifth single bit registers of the A, B, and C field element registers 205, 210, 215 and gate and register outputs selected by the input switches 235 of the A, B, and C field element registers 205, 210, 215 are as follows:

$C4''=A4'B5'+C5'$ $C5''=A4'(B4'+B5')+C4'$

The double primes indicate the output values after clocking that result from unprimed values before clocking by the first clock.

It will be appreciated that the set of logic gates 255 that are coupled between the first two single bit registers 220 of the A and B field element registers 205, 210 and the first two single bit registers 220 of the C field element register 215 are configured identically to the set of logic gates 260 and the set of logic gates 265. The inputs to and the outputs from the sets of logic gates 255, 260, 265 are coupled to respective pairs of the single bit registers 220 of the A and B field element registers 205, 210. The M single bit registers 220 of the A and B field element registers 205, 210 are coupled in the first configuration for an adjacent rotation of S (2) single bits; that is, the Q output of A1' is coupled to the D input of A0', the Q output of A0' is coupled to the D input of A1'; the Q output of A3' is coupled to the D input of A2", the Q output of A2' is coupled to the D input of A3'; and the inputs and outputs of the single bit pairs A4' and A5'; B0' and B1', B2' and B3', and B4' and B5' are similarly coupled.

Figure 5:
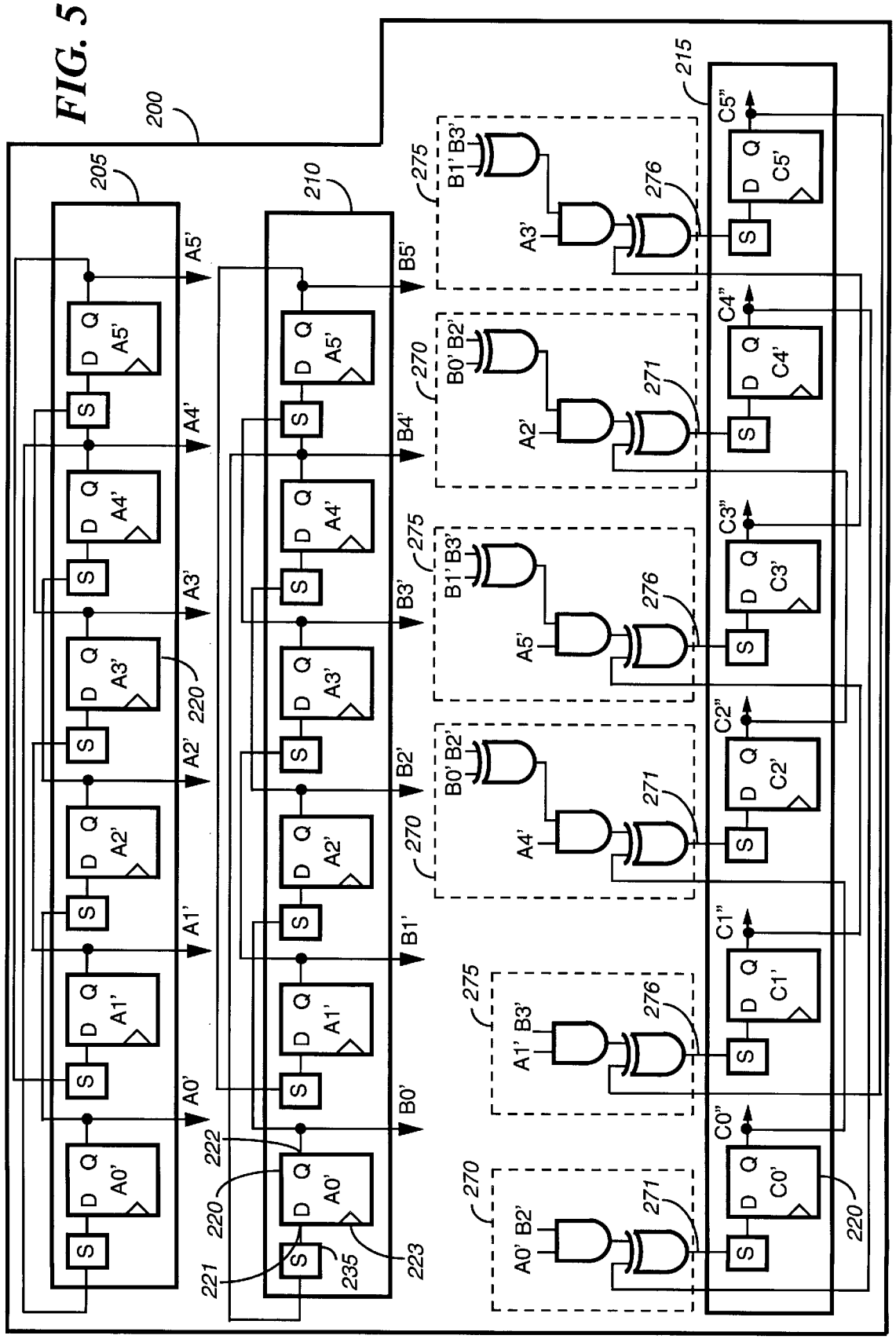
FIG. 5 is an electrical block diagram of the Galois Field ($2^6$) Arithmetic Logic Unit referenced in FIG. 4 that shows the Galois Field ($2^6$) Arithmetic Logic Unit configured for an extension field portion of the GF multiplication function, in accordance with the preferred and an alternative embodiment of the present invention.

Referring to FIG. 5, an electrical block diagram of the Galois Field $2^M$) Arithmetic Logic Unit (GF ALU) 200 shows, for M=6, I=3 and S=2, the GF ALU 200 configured for an extension field portion of the GF multiplication function, in accordance with the preferred embodiment of the present invention. This configuration is called the second configuration. The GF($2^M$) ALU 200 comprises the A and B field element registers 205, 215, the C field element register 210, the I (3) sets of subfield logic gates 255, 260, 265 (not shown in FIG. 5), and S (2) sets of extension field logic gates 270, 275. The control signal coupled to each of the switches selects one of the inputs to each switch 235, disconnecting the outputs 256, 257, 258 from, and connecting the outputs 271, 276 to, the single bit registers 220 of the C field element register 215, thereby generating a second configuration of the GF($2^M$) ALU 200.

The GF ALU 200 in this second configuration can also be described as comprising a plurality, S, of the extension sets of logic gates 270, 275. Each extension set is identically configured in an extension field configuration, each having I (3) switched outputs 271, 276. Each of the S (2) extension sets of logic gates 270, 275 is configured in the GF shift configuration to generate an extension Boolean logic function determined by the unique set of GF multiply equations that exists for the Galois field of size I (3) during a second configuration. When the GF ALU 200 is in the second configuration, the S (2) sets of subfield logic gates 270, 275, the outputs of the A and B field element registers 205, 210, and the outputs of the C field element register 215 are coupled to generate outputs of the C field element register 215 each time the A, B, and C field element registers 205, 210, 215 are clocked by a second clock.

Outputs generated by logic combinations of the set of logic gates 270, the "zeroth," second, and fourth single bit registers of the A, B, and C field element registers 205, 210, 215, and gate and register outputs selected by the input switches 235 of the A, B, and C field element registers 205, 210, 215 are as follows:

$C0"=A0'B2'+C4'$ $C2"=A4'(B0'+B2')+C0'$ $C4"=A2'(B0'+B2')+C2'$

Outputs generated by logic combinations of the set of logic gates 275, the first, third, and fifth single bit registers of the A, B, and C field element registers 205, 210, 215, and gate and register outputs selected by the input switches 235 of the A, B, and C field element registers 205, 210, 215 are as follows:

$C1"=A1'B3'+C5'$ $C3"=A5'(B1'+B3')+C1'$ $C5"=A3'(B1'+B3')+C3'$

It will be appreciated that the set of logic gates 270 are configured identically to the set of logic gates 275, for reasons described above with reference to the subfield sets of logic gates 255, 260, 265. The M single bit registers 220 of the A and B field element registers 205, 210 are coupled in the second configuration for a staggered rotation of I (3) single bits; that is, the Q output of A0' is coupled to the D input of A2', the Q output of A2' is coupled to the D input of A4', the Q output of A4' is coupled to the D input of A0', and the inputs and outputs of the single bit triplets A1', A3', A5'; B1', B2', B4'; and B1', B3', and B5' are similarly coupled.

The control signal coupled to the switches 235 causes the A and B field element registers 205, 210 to be alternately coupled to the result field register through the I (3) subfield sets of logic gates 255, 260, 265 in the first configuration and through the S (2) extension sets of logic gates 270, 275 in the second configuration. In accordance with the preferred embodiment of the present invention, the GF ALU 200 is clocked twice during the first configuration by the first clock, and is clocked once during the second configuration by the second clock. The GF multiplication product (as specified in the set of multiply equation 3 listed above on page 4, line 31 to page 5, line 8) is generated at the outputs of the C field element register 215 after the second configuration has been clocked three (1) times by the second clock. The values of the result, C0 to C5, are not necessarily located in the respective registers C0' to C5', but can be shifted such that C0 is in register C5', C1 is in the register C0', etc. A more generic description of this process is that the M bits stored in the result field element register 215 represent the GF multiplication product when I alternations are completed after clearing the result field element register 215 and loading the first and second input field element registers 210, 215 with M bit operands.

Figure 3:
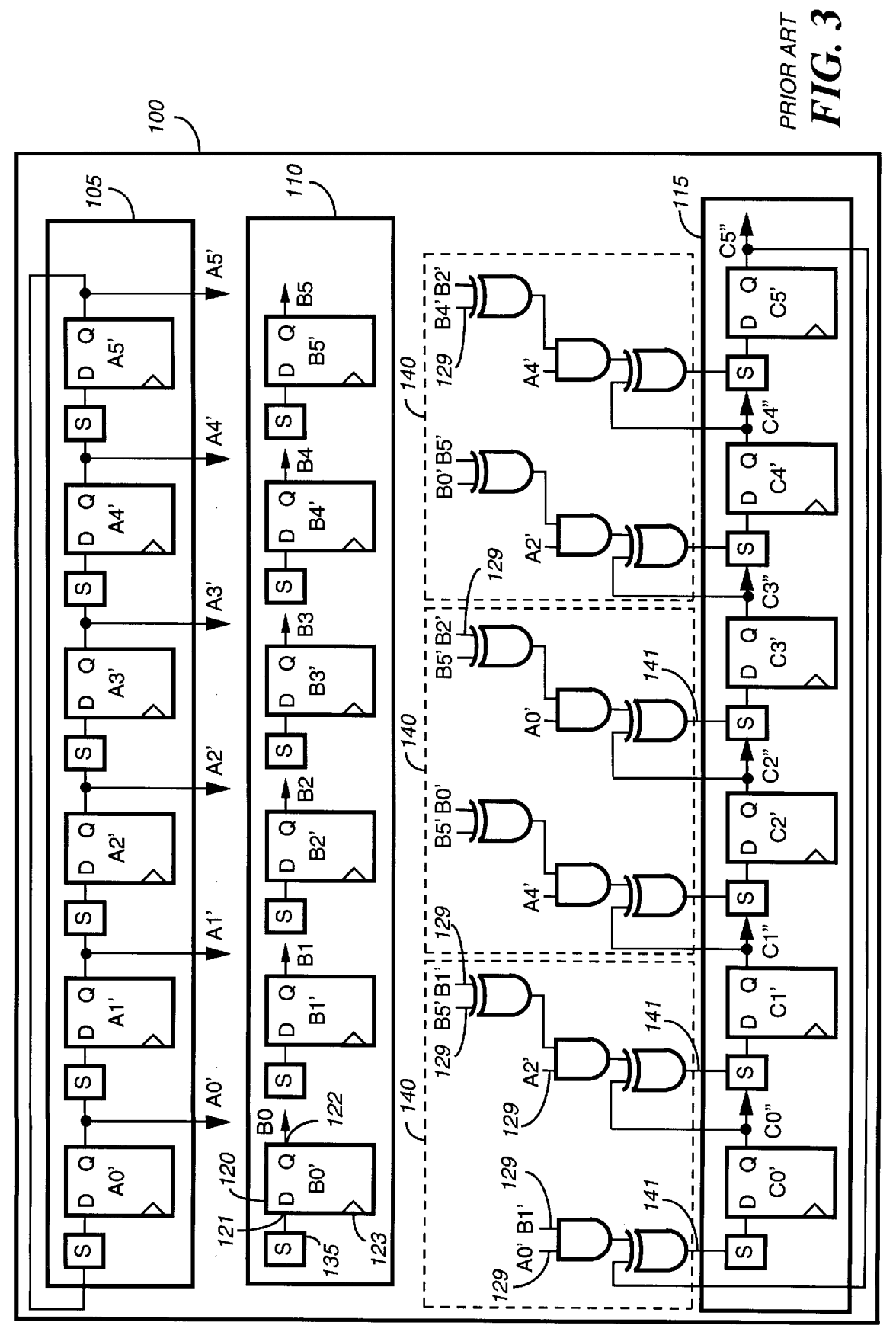

The first clock used during the first configuration is generated by a self clocking scheme in accordance with the preferred embodiment of the present invention. Such self clocking schemes are well known to one of ordinary skill in the art, and the self clocking scheme accomplishes both clockings during the first configuration one time period of the clock used to clock the second configuration. Thus the result is generated in three (1) clock cycles of the second clock, or twice as fast as for the prior art version described above with reference to FIG. 3. The preferred embodiment of the present invention uses a total of nineteen two input Boolean Exclusive OR gates and twelve two input Boolean AND gates, a substantial saving of gates in comparison to the gate intensive approach described earlier that operates in one cycle. Thus, the GF ALU 200 is a more optimum approach than either prior art scheme described above.

Figure 6:
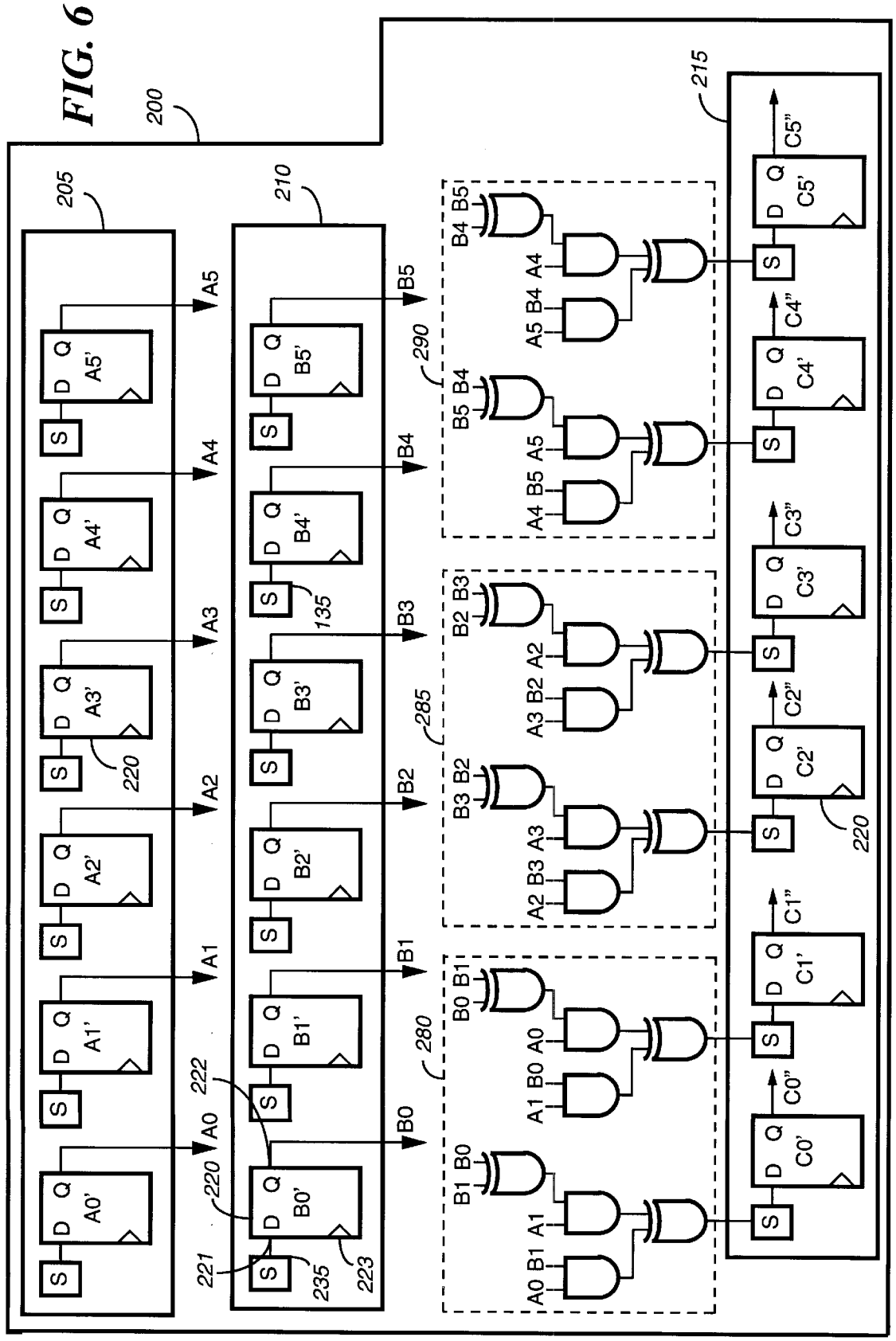
FIG. 6 is an electrical block diagram of the Galois Field ($2^6$) Arithmetic Logic Unit referenced in FIG. 4 that shows the Galois Field ($2^6$) Arithmetic Logic Unit configured for the subfield portion of the GF multiplication function, in accordance with the alternative embodiment of the present invention.

Referring to FIG. 6, an electrical block diagram of the Galois Field ($2^M$) Arithmetic Logic Unit (GF ALU) 200 shows, for M=6, the GF ALU 200 configured for a subfield portion of the GF multiplication function, in accordance with an alternative embodiment of the present invention.

In accordance with the alternative embodiment of the present invention, an alternative first configuration is used, but the second configuration is identical to that described with reference to FIG. 5. The alternative first configuration is described with reference to FIG. 6, and differs from the first configuration described with reference to FIG. 4 in that the subfield sets of logic gates 255, 250, 265 are replaced by identically configured subfield sets of logic gates 280, 285, 290, the single bit registers 220 of the A and B field element registers 205, 210 are not coupled to cause rotation of their contents, and the outputs of the C registers are coupled to the subfield sets of logic gates 280, 285, 290 differently than in the first configuration described with reference to FIG. 4.

In accordance with the alternative embodiment of the present invention, each of the I (3) subfield sets of logic gates 280, 285, 290 is configured in the purely combinatorial logic configuration (no intermediate shifting of the A and B field element registers is required).

Outputs generated by logic combinations of the subfield set of logic gates 280, the "zeroth" and first single bit registers of the A, B, and C field element registers 205, 210, 215 and gate and register outputs selected by the input switches 235 of the A, B, and C field element registers 205, 210, 215 are as follows:

$$C0''=A1'(B1'+B1')+A0'B1'$$

$$C1''=A0'(B0'+B1')+A1'B0'$$

Outputs generated by logic combinations of the subfield set of logic gates 285, the second and third single bit registers of the A, B, and C field element registers 205, 210, 215 and gate and register outputs selected by the input switches 235 of the A, B, and C field element registers 205, 210, 215 are as follows:

$$C2''=A3'(B3'+B2')+A2'B3'$$

$$C3''=A2'(B2'+B3')+A3'B2'$$

Outputs generated by logic combinations of the subfield set of logic gates 290, the fourth and fifth single bit registers of the A, B, and C field element registers 205, 210, 215 and gate and register outputs selected by the input switches 235 of the A, B, and C field element registers 205, 210, 215 are as follows:

$$C4''=A5'(B5'+B4')+A4'B5'$$

$$C5''=A4'(B4'+B5')+A5'B4'$$

The control signal coupled to the switches 235 causes the A and B field element registers 205, 210 to be alternately coupled to the result field register through the logic combinations of the I (3) subfield sets of logic gates 280, 285, 290 and the S (2) extension sets of logic gates 270, 275. In accordance with the alternative embodiment of the present invention, the GF ALU 200 is clocked once during the first configuration by the first clock, and is clocked once during the second configuration by the second clock. The GF multiplication product (as specified in the set of multiply equation 5 listed above on page 4, line 31 to page 5, line 8) is generated after the second configuration has been clocked three times (1) by the second clock.

In accordance with the alternative embodiment of the present invention, the clocking of the GF ALU 200 during the first configuration is accomplished by the self clocking scheme mentioned above. It accomplishes the clocking by the first clock in less than one time period of the second clock. Thus the result is generated in three clock cycles of the second clock, or twice as fast as for the prior art version described above with reference to FIG. 3. The alternative embodiment of the present invention uses a total of twenty-eight two input Boolean Exclusive OR gates and eighteen two input Boolean AND gates, which is still a substantial saving of gates in comparison to the gate intensive approach described earlier that operates in one cycle. A design choice between the preferred embodiment and the alternative embodiment depends on the speed achievable for the self clocking of the first configuration in comparison to the speed of the clock that runs the second configuration.

The multiply function of the GF ALU 200 in accordance with the preferred and alternative embodiments of the present invention is designed and implemented using conventional logic blocks coupled together in the unique manners described above with reference to FIGS. 4–5 or FIGS. 5–6, preferably within a single integrated circuit, and preferably forms a portion of a GF ALU 200 that provides other Galois Field operations. The present inventions are not limited the Galois Field of size 6 described above for the examples, but can be used in larger Galois Field, and will, in general provide similar or more advantageous improvements in larger size Galois Fields.

For example, in a GF ALU providing the GF multiply function in a Galois Field of size M=21, a subfield of size S=3 and extension field of size I=7 can be used to reduce the number of two input logic gates needed for a purely combinatorial implementation of the 21 unique GF multiply equations (the number is greater than 442). Were the subfield and extension fields to be implemented in accordance with the preferred embodiment of the present invention, the subfield and extension sets of logic gates are implemented using the shift configuration, and the multiply result is generated in 21 first clock cycles and 7 second clock cycles, using 62 two input gates. When self clocking can be implemented, then the multiply result is generated in 7 cycles of the second clock, providing the speed advantage desired in comparison to prior art approaches. When self clocking is not practical, then the subfield and extension fields can be implemented in accordance with the alternative embodiment of the present invention (the 7 subfield sets of logic gates are implemented using the purely combinatorial logic configuration and the 3 extension sets of logic gates are implemented using the shift configuration, and the multiply result is generated in 14 clock cycles, using approximately 116 two input gates, achieving a substantial savings of gates in comparison to a prior art purely combinatorial approach, while also achieving a 33% reduction in speed compared to a shift configuration implemented over the entire Galois field of size 21.

Figure 7:
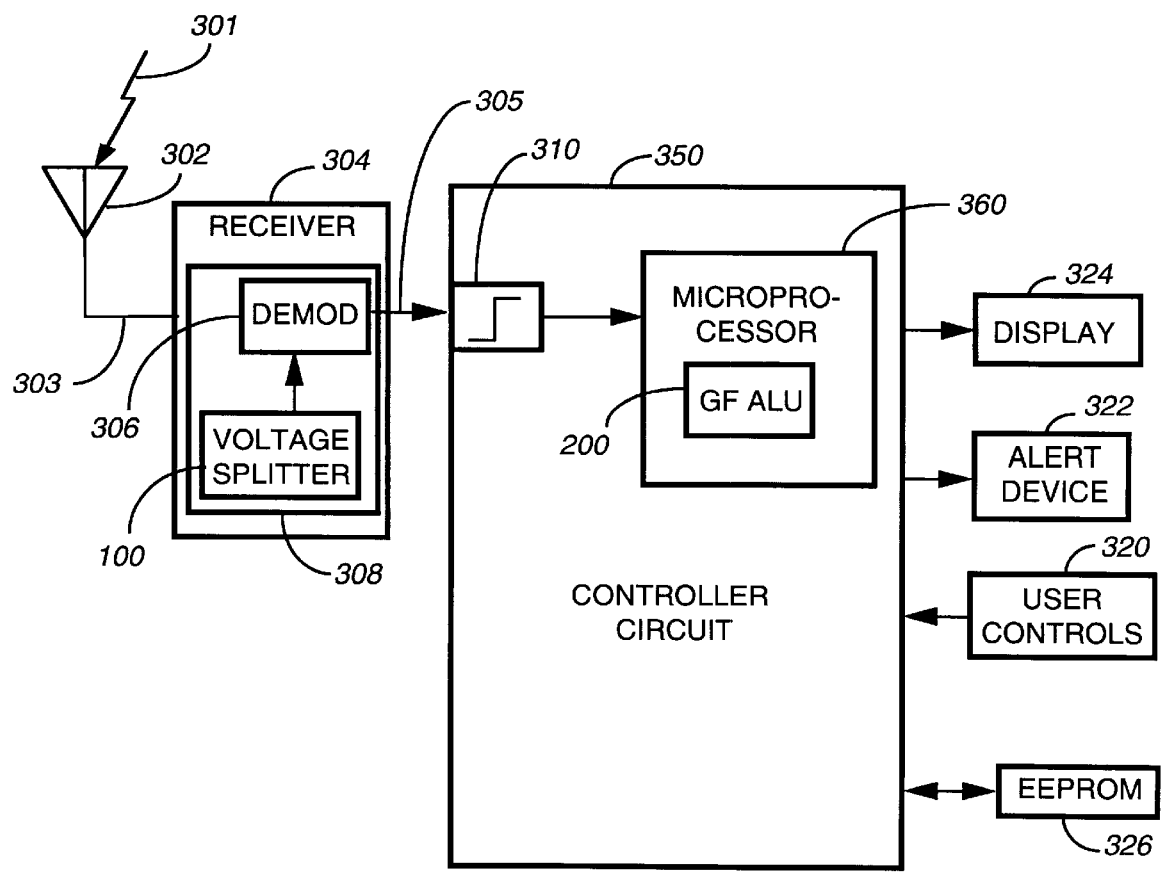
FIG. 7 is an electrical block diagram of a multichannel selective call radio, in accordance with the preferred and alternative embodiments of the present invention.

Referring to FIG. 7, an electrical block diagram of a radio 300 is shown, in accordance with the preferred and alternative embodiments of the present invention. The radio 300 is a selective call radio that includes an antenna 302 for intercepting a radiated signal 301. The antenna 302 converts the radiated signal 301 to a conducted radio signal 303 that is coupled to a receiver 304 wherein the conducted radio signal 303 is received. The receiver 304 comprises a demodulator 306. The demodulator generates a demodulated signal 305 that is coupled to a controller circuit 350. The controller circuit 350 is coupled to a display 324, an alert 322, a set of user controls 320, and an electrically erasable read only memory (EEPROM) 326.

The controller circuit 350 comprises a signal squaring circuit 310 and a microprocessor 360. The microprocessor comprises the Galois Field Arithmetic Unit 200. The demodulated signal 305 is coupled to the signal squaring circuit 310 wherein it is converted to a binary signal that is coupled to the microprocessor 360. The microprocessor 360 is coupled to the EEPROM 326 for storing an embedded address stored therein during a maintenance operation and for loading the embedded address during normal operations of the radio 300. The microprocessor 360 is a unique microprocessor comprising a unique central processing unit (CPU) that includes the GF ALU 200, a conventional read only memory (ROM), and a conventional random access memory (RAM).

A message processor function of the microprocessor 360 decrypts the received signal using the GF ALU 200. The message processor function decodes outbound words and processes an outbound message when an address received in the address field of the outbound signaling protocol matches the embedded address stored in the EEPROM 326, in a manner well known to one of ordinary skill in the art for a selective call radio. An outbound message that has been determined to be for the radio 300 by the address matching is processed by the message processor function according to the contents of the outbound message and according to modes set by manipulation of the set of user controls 320, in a conventional manner An alert signal is typically generated when an outbound message includes user information. The alert signal is coupled to the alert device 322, which is typically either an audible or a silent alerting device.

When the outbound message includes alphanumeric or graphic information, the information is displayed on the display 324 in a conventional manner by a display function at a time determined by manipulation of the set of user controls 320. All the parts of the radio 300 are conventional but for the microprocessor 360.

While the GF ALU 200 has been described above as being used in conjunction with a radio receiver, it will be appreciated that it is equally beneficial for use in other communication devices that receive and transmit digital messages that must be encoded or decoded, such as two way radios, cable receiver/transmitters, infrared transmitters or receivers, disk drives, and tape drives, or in devices that only transmit digital messages, an example of which is an alarm device.

We claim:

1. A Galois Field arithmetic logic unit (GF ALU) circuit that generates a product in a Galois Field of size M, which is configured for generating a multiplication product comprising:

first and second input field element registers, each comprising M single bit registers;

a result field element register comprising M single bit registers;

I subfield sets of logic gates, wherein each of the I subfield sets of logic gates is identically configured in a subfield configuration;

S extension sets of logic gates, wherein each of the S extension sets of logic gates is identically configured in an extension field configuration; and 3M switches coupled to the first and second input field element registers and the result field element register;

wherein the multiplication product is generated at an output of the result field element register after the first and second input field element registers are alternately coupled to the result field element register by the I subfield sets of logic gates in a first configuration of the GF ALU circuit and by the S extension sets of logic gates in a second configuration of the GF ALU circuit, under control of the 3M switches, and wherein I and S are integers greater than 1, M is equal to S multiplied by I, and a Galois Field of size S and a Galois Field of size I each has a normal basis.

2. The GF ALU circuit according to claim 1, wherein the M single bit registers of the first input field element register and the M single bit registers of the second input field element register are coupled for an adjacent rotation of S single bits during the first configuration and for a staggered rotation of I bits in the second configuration.

3. The GF ALU circuit according to claim 1, wherein bits stored in the result field element register represent the multiplication product when the first and second configurations are alternated I times after clearing the result field element register and loading the first and second input field element registers with operands.

4. The GF ALU circuit according to claim 1, wherein each of the I subfield sets of logic gates is configured to generate a subfield Boolean logic function determined by a unique set of GF multiply equations that exists for the Galois field of size S, and wherein each of the S extension sets of logic gates is configured to generate an extension Boolean logic function determined by a unique set of GF multiply equations that exists for the Galois field of size M.

5. The GF ALU circuit according to claim 1, wherein the GF ALU circuit further comprises an addition configuration and a squaring configuration.

6. An integrated circuit that comprises the GF ALU circuit according to claim 1.

7. A communication device that comprises the GF ALU circuit according to claim 1, wherein the communication device does at least one of encoding and decoding a message using the GF ALU circuit, and wherein the communication device comprises at least one of a transmitter and receiver.

8. A Galois Field arithmetic logic unit (GF ALU) circuit that generates a product in a Galois Field of size M, comprising:

first and second input field element registers, each comprising M single bit registers;

a result field element register comprising M single bit registers;

I subfield sets of logic gates, wherein each of the I subfield sets of logic gates is identically configured in a subfield configuration;

S extension sets of logic gates, wherein each of the S extension sets of logic gates is identically configured in an extension field configuration: and 3M switches coupled to the first and second input field element registers and the result field element register;

wherein the first and second input field element registers are alternately coupled to the result field element register by the I subfield sets of logic gates in a first configuration of the GF ALU circuit and by the S extension sets of logic gates in a second configuration of the GF ALU circuit, under control of the 3M switches, and wherein I and S are integers greater than 1, M is equal to S multiplied by I, and a Galois Field of size S and a Galois Field of size I each has a normal basis, and wherein the first input field element register has outputs A0', A1', A2', A3', A4', A5', the second input field element register has outputs B1', B1', B2', B3', B4', B5', the result field element register has outputs C0", C1", C2", C3", C4", C5", and wherein the I sets of subfield logic gates and the outputs of the first and second input field element registers and the outputs of the result field element register are coupled to generate the following outputs of the result field element register each time the GF ALU circuit is clocked with a first clock during the first configuration:

$C0''=A0'B1'+C1'$ $C1''=A0'(B0'+B1')+C0'$ $C2''=A2'B3'+C3'$ $C3''=A2'(B2'+B3')+C2'$ $C4''=A4'B5'+C5'$ $C5''=A4'(B4'+B5')+C4'$, and wherein the S sets of extension field logic gates and the outputs of the first and second input field element registers and the outputs of the result field element register are coupled to generate the following outputs of the result field element register each time the GF ALU circuit is clocked with a second clock during the second configuration:

$C0''=A0'B2'+C4'$ $C1''=A1'B3'+C5'$ $C2''=A4'(B0'+B2')+C0'$ $C3''=A5'(B1'+B3')+C1'$ $C4''=A2'(B0'+B2')+C2'$ $C5''=A3'(B1'+B3')+C3'$, and wherein GF ALU circuit is clocked twice during the first configuration, and wherein GF ALU circuit is clocked once during the second configuration, and wherein the Galois Field product is generated by the result register after the second configuration has been clocked three times.

9. A Galois Field arithmetic logic unit (GF ALU) circuit that generates a product in a Galois Field of size M, comprising:

first and second input field element registers, each comprising M single bit registers;

a result field element register comprising M single bit registers;

I subfield sets of logic gates, wherein each of the I subfield sets of logic gates is identically configured in a subfield configuration;

S extension sets of logic gates, wherein each of the S extension sets of logic gates is identically configured in an extension field configuration; and 3M switches coupled to the first and second input field element registers and the result field element register;

wherein the first and second input field element registers are alternately coupled to the result field element register by the I subfield sets of logic gates in a first configuration of the GF ALU circuit and by the S extension sets of logic gates in a second configuration of the GF ALU circuit, under control of the 3M switches, and wherein I and S are integers greater than 1, M is equal to S multiplied by I, and a Galois Field of size S and a Galois Field of size I each has a normal basis, and wherein M is 6, S is 2, and I is 3, and wherein the first input field element register has outputs A0', A1', A2', A3', A4', A5', the second input field element register has outputs B1', B1', B2', B3', B4', B5', the result field register has outputs C0', C1'', C2'', C3', C4'', C5'', and wherein the I sets of subfield logic gates and the outputs of the first and second input field element registers and the outputs of the result field element register are coupled to generate the following outputs of the result field element register each time the GF ALU circuit is clocked by a first clock during the first configuration:

$C0''=A1'(B0'+B1')+A0'B1'$ $C1''=A0'(B1'+B1')+A1'B0'$ $C2''=A3'(B3'+B2')+A2'B3''$ $C3''=A2'(B2'+B3')+A3'B2'$ $C4''=A5'(B5'+B4')+A4'B5'$ $C5''=A4'(B4'+B5')+A5'B4'$, and wherein the S sets of extension field logic gates and the outputs of the first and second input field element registers and the outputs of the result field element register are coupled to generate the following outputs of the result field element register each time the GF ALU circuit is clocked by a second clock during the second configuration:

$C0''=A0'B2'+C4'$ $C1''=A1'B3'+C5'$ $C2''=A4'(B0'+B2')+C0'$ $C3''=A5'(B1'+B3')+C1'$ $C4''=A2'(B0'+B2')+C2'$ $C5''=A3'(B1'+B3')+C3'$, and wherein GF ALU circuit is clocked once during the first configuration, and wherein GF ALU circuit is clocked once during the second configuration, and wherein the Galois Field product is generated by the result register after the second configuration has been clocked three times.

* * * * *